United States Patent [19]

Heraud

[11] Patent Number: 4,514,240
[45] Date of Patent: Apr. 30, 1985

[54] METHOD FOR ADHESIVELY BONDING PARTS MADE OF REFRACTORY MATERIALS

[75] Inventor: Louis Heraud, Bordeaux, France

[73] Assignee: Societe Europeenne De Propulsion, Puteau, France

[21] Appl. No.: 569,929

[22] Filed: Jan. 11, 1984

Related U.S. Application Data

[63] Continuation of Ser. No. 313,961, Oct. 20, 1981, abandoned.

[30] Foreign Application Priority Data

Oct. 30, 1980 [FR] France .................. 80 23215

[51] Int. Cl.³ .................. C03B 29/00; C04B 33/34; C04B 37/00
[52] U.S. Cl. .................. 156/89; 118/732; 264/59; 427/44; 427/249; 156/185
[58] Field of Search .......... 156/89, 185; 427/249, 427/44; 264/59; 188/251 R; 118/732

[56] References Cited

U.S. PATENT DOCUMENTS

| | | | |
|---|---|---|---|
| 2,922,722 | 1/1960 | Hutcheon | 427/249 |
| 3,091,027 | 5/1963 | Clair | 228/121 |
| 3,616,045 | 10/1971 | Kozar et al. | 156/326 |
| 3,897,582 | 7/1975 | Olcott | 188/251 |
| 3,900,592 | 8/1975 | Kennedy | 427/249 |
| 3,956,548 | 5/1976 | Kovac et al. | 156/89 |
| 3,991,248 | 11/1976 | Bauer | 427/249 |
| 4,029,829 | 5/1977 | Weaver et al. | 427/44 |
| 4,187,932 | 2/1980 | Zarembka | 156/185 |

FOREIGN PATENT DOCUMENTS

| | | | |
|---|---|---|---|
| 0686424 | 5/1964 | Canada | 156/89 |
| 1349372 | 4/1964 | France | . |
| 2028129 | 9/1970 | France | . |
| 2189207 | 1/1974 | France | . |
| 2401888 | 9/1977 | France | . |

OTHER PUBLICATIONS

AIAA/SAE 14th Joint Propulsion Conference, Las Vegas, Nev., Jul. 25-27, 1978, "Secondary Bonding of Carbon/Carbon Composites", (Davis).
AIAA/SAE/ASME 19th Joint Propulsion Conference, Seattle, Wash., Jun. 29, 1983, "Demonstration of the Feasibility of an All-Composite Space Motor", (Donguy et al.).

Primary Examiner—Jay H. Woo
Assistant Examiner—Timothy W. Heitbrink
Attorney, Agent, or Firm—Mason, Fenwick & Lawrence

[57] ABSTRACT

A method for the adhesive bonding of refractory parts wherein the refractory parts used are porous or capable of becoming porous by thermal treatment; a layer of thickness between 0.1. and 1 mm is interposed between the refractory parts, which layer is essentially formed of an adhesive which, after thermolysis, leaves a porous refractory residue, and fillers constituted by refractory particles of dimensions varying between 1 and 150 microns; the adhesive is thermolyzed so that a porous bond containing the said fillers is made between the porous refractory parts; then the assembly consisting of the refractory parts and the porous bond is densified by chemical vapor deposition of a refractory material.

9 Claims, 4 Drawing Figures

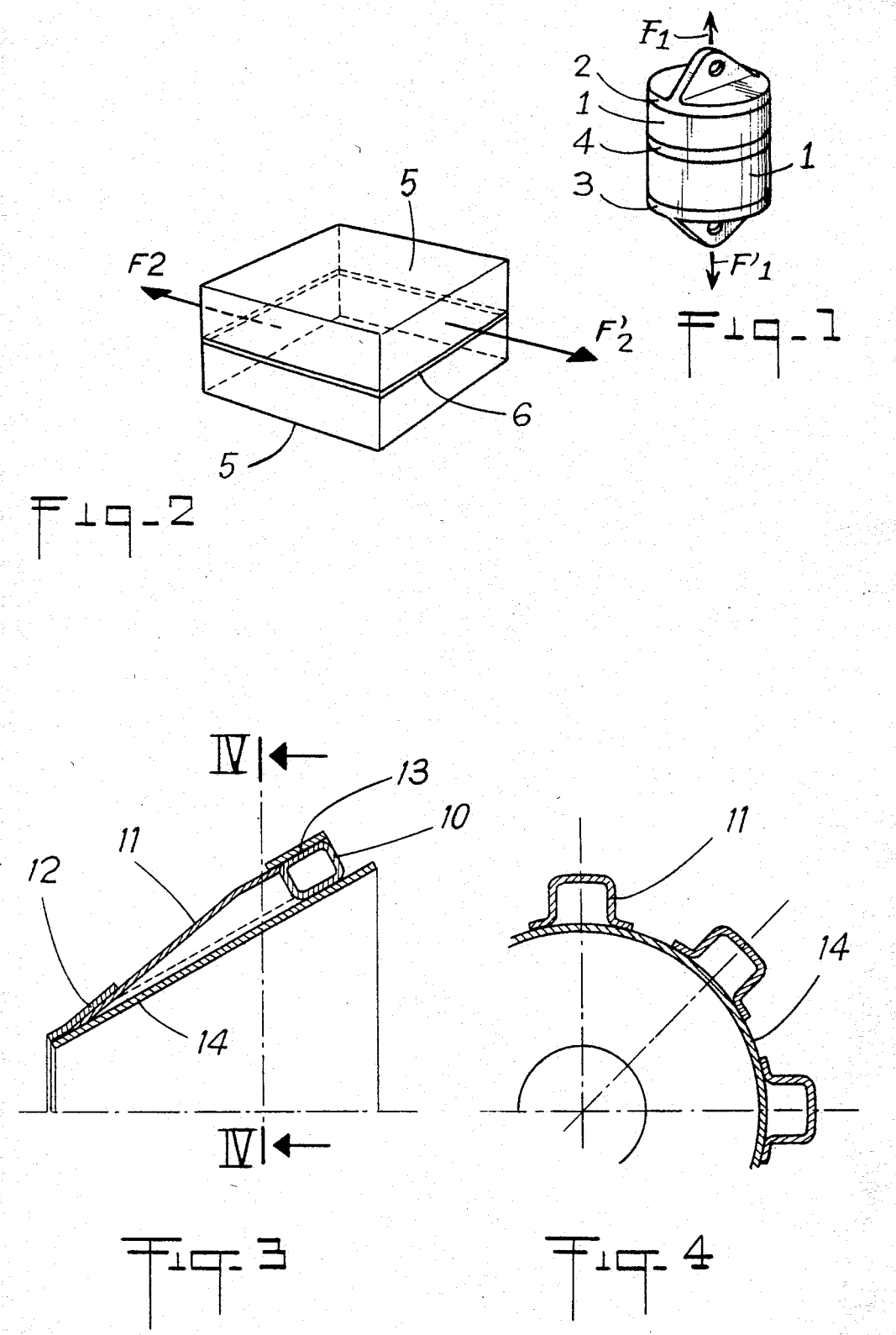

METHOD FOR ADHESIVELY BONDING PARTS MADE OF REFRACTORY MATERIALS

This is a continuation of application Ser. No. 313,961, filed 10/20/81, now abandoned.

The present invention relates to a method for bonding together preformed pieces each made of a composite refractory material. By refractory materials are meant products such as carbon, oxides carbides, borides, nitrides, silicides, etc.

A well known method for making a piece of composite material consists of embedding a reinforcement texture into a matrix. The matrix can be obtained by a densification process including impregnation of the texture with a refractory material containing binder in a liquid or viscous state, cure of the binder and thermolyzation. Another well known densification process is the chemical vapor deposition.

In particular cases, such as the making of brake discs with a friction part in carbon-carbon, it has been proposed in U.S. Pat. Nos. 4,029,829 and 4,187,932 to simplify the manufacturing process by using a central core whereupon a layer of fibrous material is wrapper or applied with interposition of a binder. After hardening and carbonization, a densification operation is performed throughout the entire thickness of the layer; this densification can be performed by chemical vapor deposition.

When it is desired to obtain a structure of composite material whose dimensions or geometry would not allow it to be obtained directly and easily from a reinforcing texture made and densified in one piece, one solution consists in prefabricating several pieces of composite material by the above known methods and, thereafter, bonding the prefabricated pieces to obtain the desired final structure.

To assemble refractory parts, it is known to use joints of a mechanical type or adhesive bondings.

The mechanical type joints, for example riveting or screwing, necessitate especially accurate machining operations on the part to be assembled. This results in, first increasing the cost price and second, reducing the properties of the assembled parts, and in particular their resistance to fatigue, the uniformity of the distribution of the strains and the reliability. To these is added a permeability to liquids and gases.

For adhesive bondings, several types of adhesives have been used, in particular adhesive containing organic binders and ceramic adhesives. The adhesives containing organic binders are efficient only if the temperatures at which the assemblies are used do not exceed 250° to 300° C. This technique is therefore unsuitable to assemble refractory parts designed to be used at very high temperatures. And as it happens, the applications at high temperature, for example the production of carbon parts for rocket nozzle elements is a privileged field of application for refractory parts.

It is true that the cement type ceramic adhesives retain their properties at high temperatures, but the strength of the bonds that they produce is too poor for the assemblies to be subjected to mechanical stresses without any risk. Ceramic adhesives are more a tamping to insure tightness between refractory parts than a break-resistant bond. This disadvantage therefore considerably limits the possibilities of use of these bonds.

For the bonding together of preformed pieces made of carbon, it has been proposed in French Pat. No. 1,349,372 to perform a welding by chemical vapor deposition of a bond entirely consisting of pyrolytic carbon. There is no intermediate adhesive bonding of the pieces to be assembled, before the chemical vapor deposition process.

In the case of preformed pieces made of carbon-carbon composite material, the British Pat. No. 1,258,553 discloses a method including the steps of providing a bonding layer between the surfaces to be assembled together, and carbonizing said layer.

More recently, in a report of the AIAA/SAE 14th Joint Propulsion Conference held in Las Vegas, Nev. in July 25-28, 1978, Mr. H. O. Davies has proposed to use a method also including the steps of providing a bonding layer and carbonizing said layer, but further improved by the performance of a subsequent impregnation with a resin/pitch system followed by graphitization.

It is an object of the present invention to provide a still improved method for bonding together preformed pieces each made of a composite material, permitting to obtain a bonding showing excellent mechanical strength at high temperature. It is especially the aim of the invention to enable the production of complex composite structures whose dimensions or geometry would not allow them to be produced by forming and densification of a reinforcing texture in one piece, whilst obtaining composite structures whose mechanical properties are similar to those of composite parts produced by densification of reinforcing in one piece.

This object is reached with a bonding method whereby, according to the invention, the preformed pieces are each made of a composite material in a porous state or in a state capable of becoming porous by thermal treatment, said method including the following steps:

providing between the faces opposite to each other of the pieces to be bonded together, a bonding layer essentially composed of an adhesive which, after thermolysis or pyrolysis, leaves a porous refractory residue, and fillers constituted by refractory particles of dimensions comprised between 1 and 150 microns, said layer having a substantially constant thickness which has a value selected in the range of 0.1 to 1 mm;

performing a thermal treatment during which said adhesive is thermolyzed or pyrolyzed so as to leave a porous bond containing said fillers between said porous pieces, and densifying the assembly consisting of the porous pieces and the porous bond by chemical vapor deposition of a refractory material, whereby a continuous deposition of said refractory material is formed simultaneously in the porosity of said bond and of the adjacent pieces.

It is the combination of the following characteristics which enables to produce a bonding procuring the desired mechanical properties:

use of porous refractory parts or of parts which can become porous, bonding with an adhesive which after thermolysis leaves a porous refractory residue, and filled with refractory particles, and densification by chemical vapor deposition both in the porous bond and in the bonded porous refractory parts.

The advantage of using porous refractory parts is on the one hand, that the operations of chemical vapor deposition in the structure of the parts to be assembled and in the bond between those parts are conducted simultaneously and, on the other hand, that the porosity of the parts permits the infiltration through to the heart of the bond. Regarding this last point, it is recommended to bond parts to be densified together when these show a relatively high porosity, which does not exclude the possibility of a partial densification of the parts before they are bonded. The porosity of one or of all the refractory parts to be bonded can result from the thermolysis of porous preforms impregnated with a carbonizable resin.

The use of an adhesive which leaves a porous residue is necessary to allow the subsequent densification of the bond during the first phase of chemical vapor deposition. As to the presence of refractory particles in the adhesive, this contributes to increasing the mechanical strength of the bond and this makes it possible to compensate for unevennesses which may exist on the surfaces to be assembled and to reduce and to divide the porosity of the bond after the thermolysis operation.

When the aim is to obtain a carbon-containing refractory residue, it is preferable to choose an adhesive which contains a resin with a high rate of residual char. The rate of residual char is the percentage by weight of the char residues after the thermolysis of the resin, in relation to the initial weight of the latter. A high rate of residual char is greater than about 40%. It can exceed 70%. By way of indication, the resins suitable for use are those of the group constituted by the phenol-formaldehyde resins, the epoxy resins, the furan resins and coal and petroleum tar pitches.

When a refractory residual other than a carbon one is required, a ceramic type adhesive can be used, for example a silico-aluminous cement in the case of the assembling of parts made of alumina with a bond subjected to a final chemical vapor deposition of alumina.

Preferably, the adhesive used should have a viscosity permitting a suitable wetting of the surfaces to be bonded and the pores created by the thermolysis should be open in order to be accessible during the chemical vapor deposition phase. Said pores should also have dimensions relatively small and regular so that they can be filled as completely and evenly as possible by the chemical vapor deposition.

The refractory particles are for example, particles of carbon powder, or fragments of carbon fibers, particles of silica, of silicium carbide or any other refractory mineral. In the case where the fillers are carbon particles, the adhesive used will preferably contain between about 20 and 50 parts by weight of resin and between 60 and 140 parts by weight of carbon fillers. When the fillers are in another material than carbon, the adhesive preferably contains between $60 \times Y$ and $140 \times Y$ parts by weight of fillers, Y being the ratio of the density of the material constituting the filler to the density of the carbon.

Before carrying out the method according to the invention, the surfaces of the parts to be bonded and the bonding material are first prepared.

The preparation of the surface consists in the normal cleaning operations such as sanding, dusting and scouring.

When the adhesive contains a resin, it is prepared by mixing the resin with, if necessary a hardening agent and with the refractory fillers. The adhesive is preferably preserved in vacuum.

The surfaces to be bonded are coated with the adhesive by means of a spatula for example, and joined one to the other. The joining is done with sufficient pressure so that the adhesive runs into the bond. The thickness of the bond is controlled by means of spacing elements of calibrated thickness such as for example glass balls; said thickness is selected to equal a value ranging between about 0.1 and 1 mm. The distance pieces are made from a material which does not react with the material of the bond at high temperature and which will not pollute the adhesive bond.

The bond is then heat-cured, normally during a baking cycle in an oven or in an autoclave. The duration of this baking cycle and the baking temperature are dependent on the constituents of the adhesive, for example of the resin and of any hardening agent used.

After curing, a post-curing treatment can be conducted to release any internal stresses present in the bond and which could give rise to cracks appearing in said bond or on the bond-part interface when the adhesive is thermolyzed. It should be noted that the post-curing treatment is not as a rule necessary.

After the curing operation and the post-curing operation (if any), a thermolyzing treatment is conducted on the bond adhesive. The thermolysis is conducted at a temperature higher than 300° C. and preferably ranging between 800° and 1000° C. in order to obtain a total thermolysis after only a short time.

After the thermolysis, the bond has the aspect of a porous refractory residue containing the fillers added initially to the adhesive.

The following operation consists in depositing a refractory material relatively homogeneously through the whole volume of the bond, using the chemical vapor deposition process. This technique can be performed according to the different known ways normally used.

The chemical vapor deposition process consists in placing the porous structure in contact with a gas containing one or more chemical specie containing the elements to be deposited and generally one or more chemical specie which could be used as reagents, carriers or diluents. In certain conditions of temperature, pressure and flow rate, the transfer of gases by diffusion, and their decomposition with release of the elements to be deposited on the substrate is possible right to the heart of the porous structure.

Reference can be made to U.S. Pat. No. 3,895,084 and to French Pat. No. 2 189 207 which describe a process for the chemical vapor deposition of carbon and to French Pat. No. 2 401 888 which describes a process for the chemical vapor deposition of refractory material other than carbon, in particular silicium or boron carbides or transition elements, diborides of the transition elements, silicium or boron nitrides, metallic silicides, etc.

The refractory material infiltrated into the bond by the chemical vapor deposition process may be pyrolytic carbon or a ceramic material such as, for example silicium carbide, alumina, titanium carbide or zirconium carbide. The infiltrated refractory material may be or may not be the same as that constituting the porous residue obtained after thermolyzing the adhesive. For example, a refractory material other than the pyrolytic carbon can be deposited inside a carbon bond resulting from the pyrolysis of a resin, and inside carbon refractory parts.

When the chemical deposition phase is carried out at a temperature higher than the temperature necessary for thermolyzing the adhesive, the thermolysis can be effected during the rise in temperature which precedes the introduction of the gaseous components necessary to the chemical vapor deposition.

The parts bonded according to the invention can be machined to their final shape without this raising any particular problems.

The special examples given hereinafter by way of information and non-restrictively show the excellent resistant to mechanical stresses and to high temperatures of the bonds according to the invention.

For these examples, reference will be made to the accompanying drawings in which:

FIGS. 1 and 2 are diagrammatical views of two sets of assembled parts according to the method of the invention;

FIG. 3 is a partial view of a meridian cross-section of a structure assembled by the method according to the invention, and FIG. 4 is a partial view of a cross-section along line IV—IV of FIG. 3.

EXAMPLE 1

Small dish-shaped samples 1 (FIG. 1) of 30 mm diameter and 10 mm thickness are produced from a composite material constituted of a woven tri-dimensional reinforcement in carbon fibers partially densified by chemical vapor deposition of silicium carbide. The samples 1 are then bonded in pairs either with an adhesive containing 100 parts by weight of silicium carbide powder of granulometry substantially 100 microns and 35 parts by weight of phenolic resin, or with an adhesive containing 100 parts by weight of carbon powder of average granulometry substantially 30 microns and 30 parts by weight of furan resin.

Test pieces are produced by coating the surface of the samples with adhesive and bonding them together, allowing bonds 4 of 0.2 mm thickness. The resins are then heat-cured and thermolyzed up to 800° C.

After thermolyzing, some of the test pieces are subjected either to a pyrolytic carbon deposition, or to a deposition of silicium carbide by chemical vapor deposition. The plane faces 1 obtained, are bonded with an epoxy adhesive on two metallic supports (2,3) permitting to make a tensile test in parallel to their axis (forces F1, F'1). Breakings occur in the bonds between the samples for tensile stresses of about 9 MPa in the case of bonds with pyrolytic carbon deposit, and on the bond-sample interface for stressed of about 17 MPa in the case of bonds with deposits of silicium carbide.

By way of comparison, after thermolysis, other test pieces are bonded directly on two metallic supports in the same way as indicated for the preceding test pieces. Breakings occur in the bonds between samples for tensile stresses approaching 0.5 MPa whatever the composition of the adhesive adopted for the bonds. A considerable increase of the tensile strength is therefore noted due to the operation of chemical vapor deposition in the porous bond proper.

EXAMPLE 2

Plate-shaped samples 5 (FIG. 2) are produced from carbon-carbon composite material constituted by a reinforcement formed by a stack of carbon cloth laminate partially densified by chemical vapor deposition of pyrolytic carbon. The samples forming rectangular parallelepipedes of identical dimensions, 30×25×10 mm.

The adhesive used contains 100 parts by weight of carbon powder for 30 parts by weight of furan resin.

Test pieces are produced by pasting together the surfaces of two samples, leaving bonds 6 of between 0.2 and 0.5 mm thickness, the resin being thereafter hot-cured.

After curing, the test pieces with a bond of 0.2 mm thickness show an interlaminar shear strength of about 0.5 MPa, whereas the test pieces with a bond of 0.5 mm thickness show an interlaminar shear strength of 0.2 MPa. Tests are conducted by subjecting the plate 5 of each tested piece to two forces F2 and F'2 (FIG. 2) respectively, which forces are equal and opposed, and oriented in parallel to the plates 5. Breakings occur in the bonds 6.

Test pieces produced as indicated hereinabove with bonds of between 0.2 and 0.7 mm thickness are subjected after curing, to a thermolyzing of the resin and to a chemical vapor deposition of pyrolytic carbon or silicium carbide.

In the case of a deposition of pyrolytic carbon the shear strengths measured were between 9.5 and 14 MPa for bonds of 0.2 mm thickness and about 9.5 MPa for bonds of 0.7 mm thickness.

Breakings occur in the thickest bonds but most breakings occurring on the test pieces with thin bonds occur in the bond-material interface or inside the material. Some of the test pieces obtained after deposition of pyrolytic carbon in the bond are subjected to a temperature of 2800° C. before the shear test. The shear strength value measured was around 6 MPa for bonds of 0.2 mm thickness.

In the case of silicium carbide depositions, the shear strengths measured are between 11 and 20 MPa, breakings always occurring on the bond-material interface or in the material.

EXAMPLE 3

Three layers of a carbon-carbon composite material are assembled to produce an aircraft brake disk, the two lateral layers constituting the friction layers.

Each of said lateral layers is obtained from a carbon cloth cut into disk-shaped strata stacked one above the other. Said stack is placed in an installation to be rigidified by pyrolytic carbon deposition as known per se. Each preform so obtained is thereafter machined by dry grinding using a diamond grinding wheel. The state of the resulting surface is relatively coarse.

The central layer is obtained from the same cloth as the lateral layers, but the cloth is cut in annular sectors of 90° placed edge to edge to reduce trimmings to a minimum. As before, the layers of cloth are rigidified and partially densified by deposition of pyrolytic carbon and the central layer is machined.

The surfaces to be assembled are simply dusted before being coated with the adhesive containing 100 parts by weight of carbon powder and 35 parts by weight of furan resin, and to which are added glass balls of 0.2 mm diameter in the proportion of 3% by volume.

The bonded layers are placed between two metal plates and the pressure necessary for the adhesive to run through is applied by means of cramps, the glass balls forming distance pieces. The layers so held in position are placed in an oven where they are subjected to a curing cycle consisting in a first five-hour phase at 100° C., followed by a second 15-hour phase at 120° C.

After removing the holding equipment, the assembled layers are placed inside an enclosure for the chemical vapor deposition of pyrolytic carbon according to the known process, this deposition having been preceded by a rapid rise of temperature during which the resin is thermolyzed.

The resulting disk is subjected to a treatment at a very high temperature without its resistance being in any way affected. Tried on an aircraft brake, the disk proved to be entirely satisfactory.

EXAMPLE 4

Different test pieces are produced in carbon-carbon composite material for the construction of blast pipes for rocket nozzles.

A part of a nozzle neck, obtained from a multidirectional reinforcement of carbon fibers, partially densified by resin coke, and two parts upstream of the neck made from carbon cloth cut into full layers, rigidified and partially densified by pyrolytic carbon infiltration, are used to make up the assembly.

The parts to be assembled are coated with adhesive as indicated in example 2 and the resin of the adhesive is subjected to a curing cycle of 50 hours at 75° C.

The assembly is thereafter treated under a very strong heat and machined to its final shape before the pyrolytic carbon infiltration by the chemical vapor deposition process.

On the resulting assembly is mounted a divergent tube to constitute a rocket nozzle. The assembly has proved to have a satisfactory resistance under blasting despite a violent thermal stress, high mechanical stresses and despite the fact that the assembled parts were not made of the same material.

EXAMPLE 5

The assembling method according to the invention has enabled the production of a casing for a rigid refractory nozzle, of a new design, from coffered parts in a porous and partially densified carbon-carbon composite material.

The different parts used are a hollow ring 10 (FIGS. 3,4) which ensures the rigidity of the assembly within its plane, coffered ribs 11 which ensure the rigidity of the assembly under bending stresses and axial compression and connecting plates and cones 12, 13, 14 joined to the ribs 11 and to the ring 10 by the assembling method according to the invention.

The truncated portion 14 forms the inside of the casing and has on its external face the coffered longitudinal ribs 11 and the hollow rigidifying ring 10 (FIG. 3). The plate 12 is placed at the other end of the casing and surrounds the other ends of the ribs 11 and of the ring 10 (see FIG. 3).

The different parts which constitute the assembly are produced by molding a material composed of carbon cloth embedded in a phenolic resin matrix. After molding, the parts are sanded down to remove the skin of the resin and then scoured.

An adhesive such as that used in example 2 is coated on the surfaces to be assembled, and the assembly is then subjected to a baking cycle at 120° C. for curing the resin of the adhesive.

After the said curing, the assembly is subjected to a thermolyzing treatment to transform the resin of the composite material of the parts and the resin of the bonds into coke. The porous and refractory resulting product is then placed inside an enclosure where a chemical vapor deposition of pyrolytic carbon is conducted through the entire product so as to strengthen the adhesive bonds and to give to the composite material of the different parts its final properties.

The resulting assembly has proved to have such satisfactory mechanical strength and heat resistance as could not have been obtained with the known assembly methods.

EXAMPLE 6

A crucible was produced by bonding together a cylindrical part and a circular plate, both constituted by a carbon felt, partially densified by chemical vapor deposition of silicium carbide. When bonding the said parts, their residual open porosity was around 50% in volume.

The adhesive contained 100 parts by weight of silicium carbide powder of granulometry between 50 and 150 microns, and 100 parts by weight of resin giving silicium carbide by thermolysis. After coating and bonding the surfaces together, leaving a bond line of 0.5 mm thickness, the crucible was placed in an oven for chemical vapor deposition of silicium carbide, wherein the said bond was thermolysed, and the bond and the two parts constituting the crucible were densified by the deposition, in the same operation.

The crucible was then used with success for electrolyzing the sulphuric acid at 650° C. under a pressure of 7 bars.

The invention is in no way limited to the description given hereinabove and on the contrary covers any additions and modifications that can be brought thereto without departing from the scope thereof.

What is claimed is:

1. Method for bonding together into an integral assembly preformed members each comprised of a composite refractory material which is porous or become porous upon pyrolysis, said method comprising the following steps:

assembling said members with a bonding layer between mutually adjacent faces thereof, said bonding layer consisting essentially of an adhesive which upon pyrolysis leaves a porous refractory residue, and a filler constituted by refractory particles of dimensions comprised between 1 and 150 microns, said layer having a substantially constant thickness which has a value selected in the range of 0.1 to 1 mm;

subjecting the thus-formed assembly to pyrolysis to create between the members thereof a porous refractory bond containing said filler between the mutually adjacent faces of said members, and densifying the pyrolyzed assembly by chemical vapor deposition into the pores thereof of a refractory material, whereby said densifying refractory material is deposited simultaneously and continuously in the pores of said bond and of the adjacent member to produce an integral densified assembly.

2. A method as claimed in clam 1, wherein said chemical vapor deposition is carried out at an elevated temperature at least sufficient to effect pyrolysis of the bonded assembly whereby pyrolysis occurs during heating preparatory to said chemical vapor deposition.

3. A method as claimed in claim 1, wherein said assembly is densified by chemical vapor deposition of pyrolytic carbon or a ceramic material.

4. The method as claimed in claim 1, wherein the amount by weight of said refractory particles is at least about equal with the amount of said adhesive in said bonding layer.

5. A method as claimed in claim 1, wherein said pyrolyzed assembly is densified by chemical vapor deposition of silicon carbide.

6. A method as claimed in claim 1, wherein said bonding layer consists essentially of between 20 and 50 parts by weight of a carbonizable resin and between $60 \times Y$ and $140 \times Y$ parts by weight of said refractory filler, Y being the ratio of the density of said refractory filler to the density of carbon.

7. A method as claimed in claim 1, wherein each of said preformed members is formed of a porous and partially densified carbon-carbon composite material.

8. A method for bonding together into an integral assembly prefabricated rigid members of a porous and partially densified refractory composite, comprising the following steps:

assembling said members with a bonding layer between mutually adjacent faces thereof, said bonding layer consisting essentially of an adhesive which, upon pyrolysis, leaves a porous refractory residue, and a filler constituted by refractory particles of dimensions comprised between 1 and 150 microns, said layer having a substantially constant thickness which has a value selected in the range of 0.1 to 1 mm;

subjecting said assembly to pyrolysis to pyrolyze said bonding layer and form a porous refractory bond containing said filler between the mutually adjacent faces of said porous members, and densifying the pyrolyzed assembly by chemical vapor deposition into the pores thereof of a refractory material, whereby said densifying refractory material is deposited simultaneously in the pores of said bond and of the adjacent pieces to produce an integral densified assembly.

9. A method as in claim 8, wherein the weight of said refractory particles is at least about equal with the weight of said adhesive in said bonding layer.

* * * * *